United States Patent
Li et al.

(10) Patent No.: US 12,400,352 B2
(45) Date of Patent: Aug. 26, 2025

(54) SYSTEM FOR COUNTING OBJECTS IN AN ULTRA-WIDE SCENE

(71) Applicant: Black Sesame Technologies Inc., San Jose, CA (US)

(72) Inventors: Zhaonan Li, Singapore (SG); Tao Xi, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 363 days.

(21) Appl. No.: 18/121,674

(22) Filed: Mar. 15, 2023

(65) Prior Publication Data

US 2024/0312042 A1    Sep. 19, 2024

(51) Int. Cl.
*G06K 9/00*    (2022.01)
*G06T 7/70*    (2017.01)
(Continued)

(52) U.S. Cl.
CPC ............. *G06T 7/70* (2017.01); *G06V 10/25* (2022.01); *G06V 10/56* (2022.01); *G06V 10/761* (2022.01);
(Continued)

(58) Field of Classification Search
CPC . G06T 2207/20081; G06T 2207/20084; G06T 7/0012; G06T 2207/10024; G06T 2207/20132; G06T 2207/20221; G06T 2207/30041; G06T 2207/30168; G06T 3/40; G06T 7/00; G06T 7/0002; G06T 7/0014; G06T 7/11; G06T 1/20; G06T 2207/10081; G06T 2207/10088; G06T 2207/20182; G06T 2207/30016; G06T 2207/30061; G06T 2207/30096; G06T 2207/30242; G06T 7/70

See application file for complete search history.

(56) References Cited

U.S. PATENT DOCUMENTS 9,251,410 B1 * 2/2016 Lin ................ G06V 40/173
9,412,268 B2   8/2016 Saptharishi et al.
(Continued)

FOREIGN PATENT DOCUMENTS

CN        1941850        4/2007
CN      101883261       11/2010
(Continued)

OTHER PUBLICATIONS

Liu, W., Anguelov, D., Erhan, D., Szegedy, C., Reed, S., Fu, C. Y., & Berg, A. C. (Oct. 2016). Ssd: Single shot multibox detector. In European conference on computer vision (pp. 21-37). Springer, Cham.
(Continued)

*Primary Examiner* — Alex Kok S Liew
(74) *Attorney, Agent, or Firm* — Timothy T. Wang; Ni, Wang & Massand, PLLC

(57) ABSTRACT

The present invention discloses a system and a method for object counting in an ultra-wide scene. The system comprises a device set with a rotatable camera and a low cost IMU. The system is used for object counting tasks like traffic flow monitoring. The present invention discloses an efficient solution for object counting with a rotatable camera and a gyroscope mounted on the camera with a number of modules for object detection and counting.

17 Claims, 7 Drawing Sheets

Example of bounding boxes result from re-projection step

(51) Int. Cl.
*G06V 10/25* (2022.01)
*G06V 10/56* (2022.01)
*G06V 10/74* (2022.01)
*G06V 10/764* (2022.01)
*H04N 23/698* (2023.01)

(52) U.S. Cl.
CPC ......... *G06V 10/764* (2022.01); *H04N 23/698* (2023.01); *G06T 2207/30242* (2013.01)

(56) References Cited

U.S. PATENT DOCUMENTS

| 9,646,211 | B2 | 5/2017 | Ghanem et al. |
| 2020/0074739 | A1* | 3/2020 | Stauber .................. G06F 3/011 |
| 2020/0175326 | A1* | 6/2020 | Shen .................... G05D 1/2465 |
| 2021/0112238 | A1* | 4/2021 | Bylicka ..................... G06T 5/50 |
| 2022/0215206 | A1* | 7/2022 | Lin ....................... G06F 18/214 |

FOREIGN PATENT DOCUMENTS

| CN | 103700106 | 4/2014 |
| CN | 108629791 | 10/2018 |
| CN | 109215085 | 1/2019 |
| EP | 1563686 | 8/2005 |
| KR | 101808587 | 12/2017 |

OTHER PUBLICATIONS

Redmon, J., Divvala, S., Girshick, R., & Farhadi, A. (2016). You only look once: Unified, real-time object detection. In Proceedings of the IEEE conference on computer vision and pattern recognition (pp. 779-788).

* cited by examiner

Re-projection from frame j to the base frame

—— Frame 0
— — Frame j

SYSTEM FOR COUNTING OBJECTS IN AN ULTRA-WIDE SCENE

FIELD OF THE INVENTION

The present invention discloses a system for counting objects in an ultra-wide scene. More specifically, the invention discloses an object counting system in an ultra-wide scene with a rotatable camera and a low-cost IMU.

BACKGROUND OF THE INVENTION

With the rapid development of computer vision and AI technology, increasingly intelligent applications have emerged based on cameras for enhancing visual perception and liberating productivity in prolonged and hyperfine observation tasks. Object counting is an application based on object detection and object tracking. Currently, CCTV surveillance cameras play a major role in tasks such as crowd control and traffic flow monitoring. Such cameras are usually fixedly mounted at a high vantage point for a clear and stable line of sight to guarantee the robustness of the hardware and algorithm. The lens type can be chosen by the user before installation for different scenes and purposes, which decide the applicable field of view (FOV). When a scene of interest exceeds the FOV of the camera, a common solution is either adding more cameras with extra cost or using an ultra-wide lens with severe distortion cured by complicated algorithms.

U.S. Pat. No. 8,547,437 to Buehler et al. discloses a method and system for tracking and behavioral monitoring of multiple objects moving through multiple fields-of-view. Buehler teaches a solution for object tracking in a wide-scene, but lacks the feature of counting objects utilizing a number of sensors for tracking the objects.

U.S. Pat. No. 9,412,268 to Saptharishi et al. discloses a vehicle detection and counting system. Saptharishi teaches an application for counting objects crossing a detection zone and generating reports from object count data to provide traffic flow pattern information. Although Saptharishi advances Buehler in terms of counting an object in a video, the system still utilizes signaling of an occurrence of an event performed upon determination of a specified number of vehicles.

The cited prior fail to disclose an efficient object counting solution in an ultra-wide scene with a rotatable camera and low-cost IMU. Hence, there is a need for a system that does not depend on stitching all the frames in one panorama image to conduct object counting in the whole scene. The present invention only takes the useful information of objects, a bounding box with condensed features, to perform an efficient analysis in real-time.

Therefore, a system is needed with high extendibility comprising a core algorithm with an object detection module, a re-projection module, and an NMS module. Similar algorithms can be further added to refine the bounding box with more features.

The present invention is a system with high adaptability for different scenes. Compared to other algorithms for stationary cameras, our solution empowers customers to use one rotatable camera to capture the whole scene of interest without any FOV limitations.

As discussed herein, there is a present need for a system or method for counting objects in an ultra-wide scene. It is apparent that numerous methods and systems have been developed in the prior art that are adequate for various purposes. Furthermore, even though these inventions may be suitable for the specific purposes to which they address, they are not suitable for the purposes of the present invention as heretofore described. Thus, there is a need to provide a novel and improved system for counting objects in an ultra-wide scene.

BRIEF SUMMARY OF THE INVENTION

Object counting is an application based on object detection and object tracking. Currently, CCTV surveillance cameras play a major role in tasks such as crowd control and traffic flow monitoring. Such cameras are usually fixedly mounted at a high vantage point for a clear and stable line of sight to guarantee the robustness of the hardware and algorithm. The lens type can be chosen by the user before installation for different scenes and purposes, which decide the applicable FOV.

When a scene of interest exceeds the FOV of the camera, a common solution is either adding more cameras with extra cost or using an ultra-wide lens with severe distortion cured by complicated algorithms. The present invention discloses a method using a camera that can scan in pitch and yaw direction and an attached gyroscope with efficient algorithms to detect and track objects in real-time. The results is finalized into numbers of the unique object with its class label to provide a statistical description of the scenes. This method has numerous applications, such as inventory counting in a warehouse or further analysis of a scenario to perform other functional reactions for entertainment purposes.

The primary objective of the present invention is to develop a system for object counting for an ultra-wide scene. The system comprises a device set, an object detection module, a re-projection module, and a non-maximum suppression module.

The device set comprises a rotatable camera and an IMU. The device set captures the ultra-wide scene. The object detection module comprises a data aligner and an object detector. The data aligner divides the scene into a number of frames. Moreover, one or more coordinates are defined by a system on each frame of the plurality of frames. The object detector detects one or more objects in the number of frames. Each detected object from the one or more objects is assigned with a 2D bounding box with a location in frame coordinate and a classification ID with a score for duplication filtering.

The re-projection module re-projects a number of bounding boxes from each frame to a pixel coordinate of a base frame to detect duplication.

The non-maximum suppression module comprises a suppressor, a comparator, and a retriever. The suppressor conducts suppression to reject detected duplicates for each frame after re-projection. The number of bounding boxes with a certain threshold overlaps (e.g., 50% or more) are considered as the same object. The comparator compares the boxes that are considered from the same object with the scores. The higher score indicates more accurate detection and will be preserved and stored in the database. The retriever retrieves a list of appeared objects with a classification ID and the count in the ultra-wide scene.

Another aspect of the present invention is a gyroscope mounted or embedded on the camera to provide real-time rotational information.

Another aspect of the present invention is wherein the object detection module comprises a lightweight AI model. The lightweight AI model is better with optimization, such as quantization, and valid for GPU and DSP acceleration.

The lightweight AI model is a pre-trained model, further wherein the lightweight AI model is SSD and Yolo.

Another aspect of the present invention is wherein the object detector module is capable of performing a fine-tuning with the generally available object classes in the scenes in case of higher accuracy for professional application. The object detection is extended with other algorithms to enrich one or more features of an object in the scene.

Another aspect of the present invention is that the one or more features are color and direction of the object, to improve the precision of identifying the same object after re-projection.

Another aspect of the present invention is wherein the system applies Intersection over Smallest (IoS) as the criteria of overlap.

Another aspect of the present invention is an NMS module, which comprises a single bounding box for each the objects in the scene.

Another aspect of the present invention is an efficient solution for object counting for an ultra-wide scene with a rotatable camera and low-cost IMU. For object counting tasks like traffic flow monitoring, we usually select fixed surveillance cameras as inputs to the algorithm. Thus, the present invention discloses an efficient solution for object counting with a rotatable camera and a gyroscope mounted on the camera.

To the accomplishment of the above and related objects, the present invention may be embodied in the form illustrated in the accompanying drawings, attention being called to the fact, however, that the drawings are illustrative only, and that changes may be made in the specific construction illustrated and described that are within the scope of the claims.

Although, the invention is described herein in terms of various exemplary embodiments and implementations, it should be understood that the various features, aspects, and functionality described in one or more of the individual embodiments are not limited in their applicability to the particular embodiment with which they are described. Instead, they can be applied, alone or in various combinations, to one or more of the other embodiments of the invention, whether or not such embodiments are explicitly described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings.

DETAILED DESCRIPTION

The present invention discloses a solution started with a camera and an IMU to work as an input "Device Set." The camera is assumed to be fixed on a base with two degrees of freedom (DOF) for scanning in yaw (top-down) and pitch (left-right) directions. A gyroscope is mounted firmly or embedded on the camera that can provide real-time rotational information. When the camera starts to capture images, the Devices Set can yaw and pitch smoothly until it covers the whole scene of interest. The rotation center is suggested to coincide with the optical center of the camera to ensure accurate object tracking and counting results.

Figure 1A:
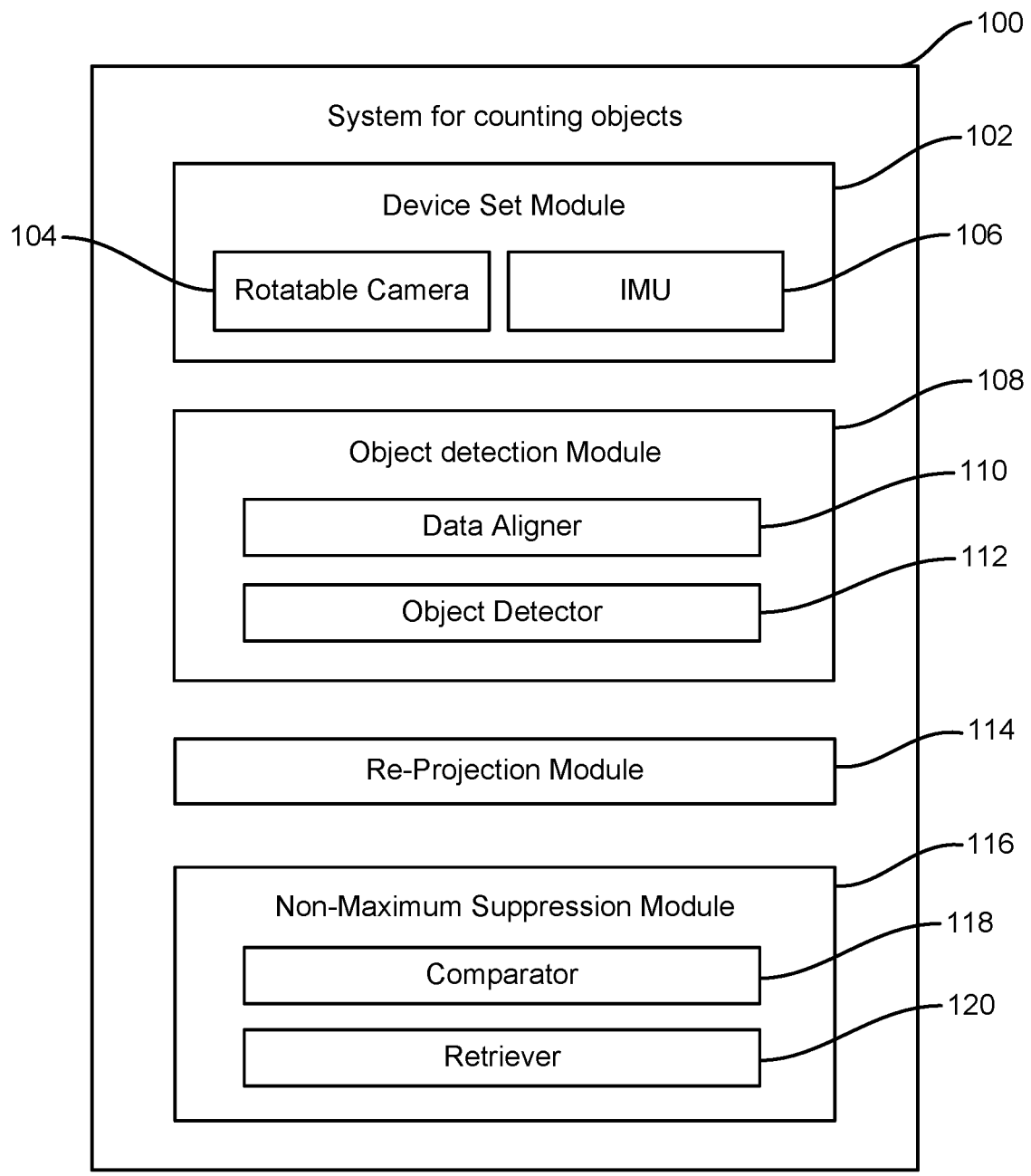
FIG. 1A illustrates a system for counting object in an ultra-wide scene in accordance with the present invention.

FIG. 1A discloses a system for counting object in an ultra-wide scene. The system 100 comprises a device set 102, an object detection module 108, a re-projection module 114, and a non-maximum suppression module 116. The device set 102 comprises a rotatable camera 104 and an IMU 106. The device set 102 captures the ultra-wide scene. The object detection module 108 comprises a data aligner 110 and an object detector 112. The data aligner 110 divides the scene into a number of frames. Moreover, one or more coordinates are defined by a system on each frame of the plurality of frames. The object detector 112 detects one or more objects in the number of frames. Each detected object from the one or more objects is assigned with a 2D bounding box with a location in frame coordinate and a classification ID with a score for duplication filtering.

The re-projection module 114 re-projects a number of bounding boxes from each frame to a pixel coordinate of a base frame to detect duplication.

The non-maximum suppression module 116 comprises a comparator 118 and a retriever 120. In one embodiment, a suppressor conducts suppression to reject detected duplicates for each frame after re-projection. The numbers of bounding boxes with a certain threshold (e.g., 50% or more) overlap are considered as the same object. The comparator 118 compares the boxes that are considered from the same object with the scores. The higher score indicates a more accurate detection that will be preserved and stored in the database. The retriever 120 retrieves a list of appeared objects with a classification ID and the count in the ultra-wide scene.

Data alignment is conducted as the first step: camera streams with a frame rate $f_c$ and gyroscope obtain angular velocity with frequency $f_g$ which is usually much higher than the frame rate. With the timestamp of each frame, the two moments of angular speed with the closest timestamp are used for a precise angular speed of this frame by linear interpolation.

The second step is object detection performed on each image frame, which is the most time-consuming step in the whole solution. To achieve real-time performance, a lightweight AI model is preferred, as such models are better with optimization, such as quantization, and valid for GPU and DSP acceleration. A pre-trained model, such as SSD[1] and Yolo[2], is usually enough for entertainment purposes. If higher accuracy is required for professional application, a fine-tuning can be performed with the generally available object classes in our target scenes.

Only those with scores exceeding the confidence threshold for a relative class can output to the re-projection step. Object detection can be extended with other algorithms to enrich the features of an object, such as color and direction, which can improve the precision of identifying the same object after re-projection. For example, after objection detection, each 2D bounding box will be parsed with its location, class, and score (the confidence that the object is classified as class X, usually normalized to [0,1]). The threshold for confidence is usually different for each class of objects. For example, we take 0.3 for 'Car' and 0.5 for 'Others', which means if the object is classified as a 'Car' and only if its score is larger than 0.3, then it can be recorded as a 'Car'. And those objects classified as 'Other' need to have scores larger than 0.5 so that they can be recorded as 'Other'.

In the third step, the outstanding bounding boxes from each frame are re-projected to the base frame, as illustrated in FIG. 1(A). Since the pure rotation of the camera will not be able to recover depth with the essential matrix, an assumption is made that all the objects are in 2D and coplanar. The fourth and final step is conducting suppression to reject detected duplicates for each frame after re-projection.

Each incoming bounding box is compared with the existed bounding box with the same class label in the database. Boxes with more than a certain threshold (e.g., 50%) overlap are considered as the same object. Unlike normal object detection tasks with a stationary camera where the objects appear with a size invariant bounding box, the objects here may appear partially at the foregoing frame, exist completely for a while, and exit gradually in the sequential frame. An example of re-projected bounding box without NMS is shown in FIG. 1(A). When the camera pitches from left to right, the object at the top is cutout of the frame from its left and leaving a partial bounding box to its right. Hence, "Intersection over Smallest" (IoS) is applied instead of "Intersection over Union" (IoU) as the overlap criteria.

The boxes that are considered from the same object will be compared with their score. Only the higher score indicating a more accurate detection will be preserved and stored in the database. Be aware that there is only one bounding box left for each unique object always. Repeat steps 1-3 until all frames are processed and the camera stops streaming.

After the user stops capturing, our algorithm ends with finalizing the results from the database. A list of appeared objects is retrieved from their classification ID with their counts in this scene during the whole capture time.

Figure 1B:
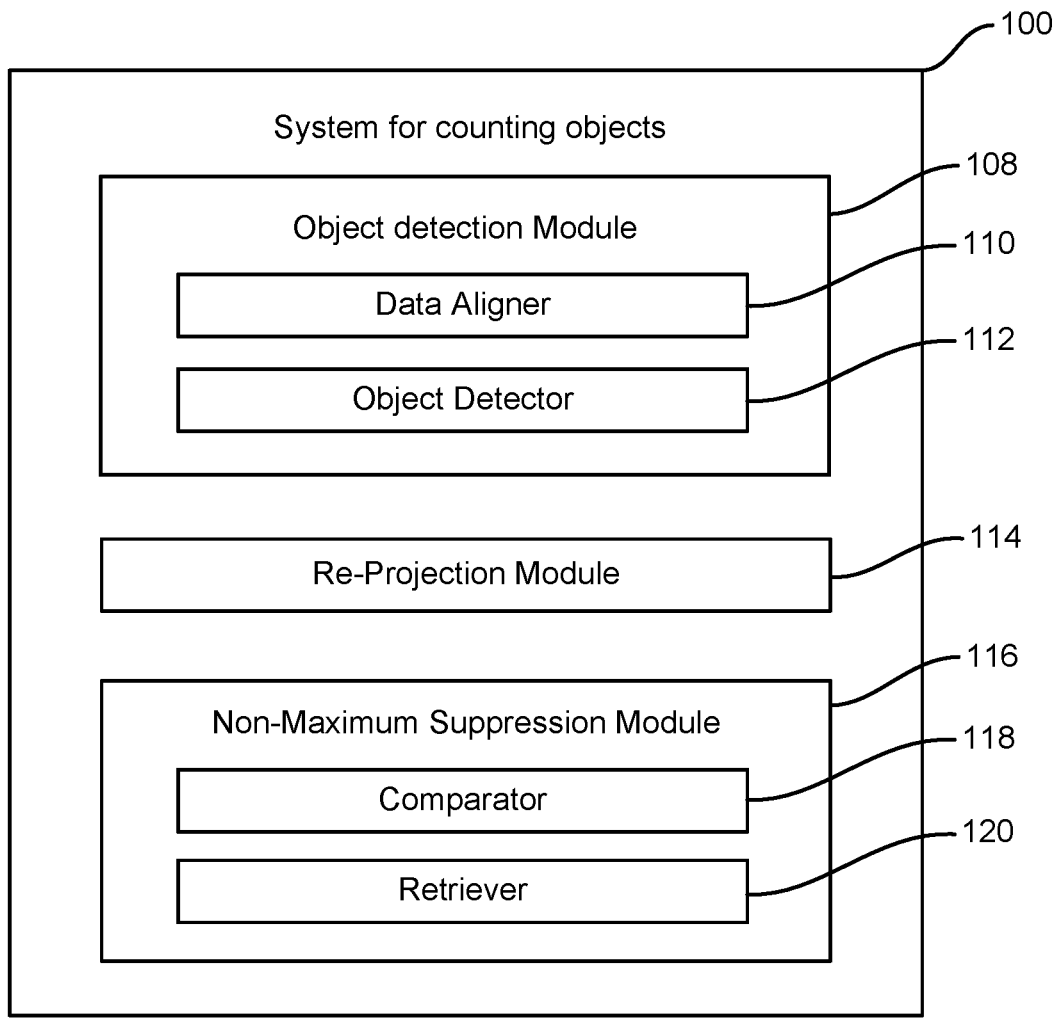
FIG. 1B illustrates a system for counting objects in an ultra-wide scene with a rotatable camera and a low-cost IMU scene in accordance with the present invention.

FIG. 1B illustrates a system for counting objects in an ultra-wide scene with a rotatable camera and a low-cost IMU scene. The system 100 comprises an object detection module 108, a re-projection module 114, and an NMS module 116.

The object detection module 108 comprises a data aligner 110 and an object detector 112. The data aligner 110 divides the ultra-wide scene into a plurality of frames. The data aligner 110 defines one or more coordinates to the plurality of frames. The object detector 112 detects one or more objects in the plurality of frames. Moreover, the object detector 112 assigns a 2-D bounding box with a location in frame coordinate and a classification ID with a score for duplication filtering.

The object detection module 108 is based on a lightweight artificial intelligence (AI) model. The lightweight AI model can be optimized and quantized during detection of the objects. Also, the lightweight AI model is a pre-trained model selected from either of SSD, Yolo, or the like.

The object detection module 108 is coupled with one or more algorithms to enrich one or more features of the objects in the ultra-wide scene. Moreover, one or more features can include either color of the object or direction of the object to improve the precision of identifying the objects after re-projection.

The re-projection module 114 re-projects the 2-D bounding box from the plurality of frames to a base frame. The re-projection module 114 re-projects the 2-D bounding box on the base frame before intersection over smallest (IoS) logic. Further, the IoS is used to determine the level of overlap of two bounding boxes, if the IoS meets a criteria, those two bounding boxes indicate the same object.

The non-maximum suppression module 116 comprises a comparator 118 and a retriever 120. The comparator 118 compares each 2-D bounding box of the one or more objects with each other and allocates a group ID to similar 2-D bounding boxes. The retriever 120 retrieves the count of the one or more objects with the same group ID for counting the objects in the ultra-wide scene.

Figure 2:
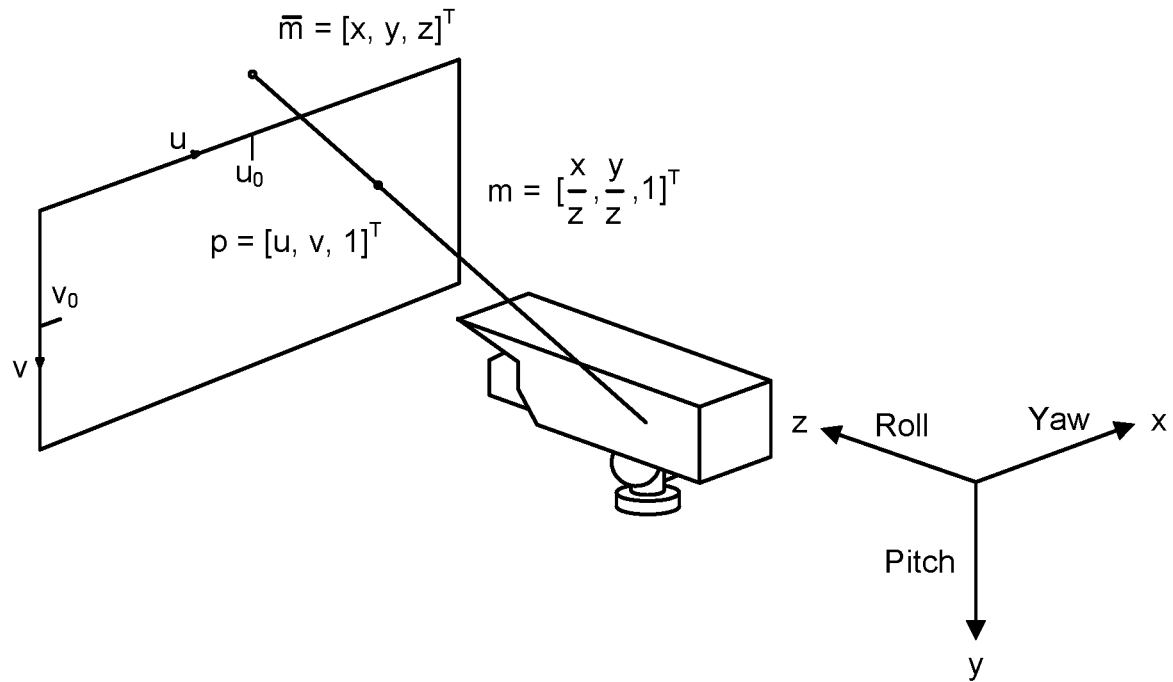
FIG. 2 illustrates a system coordinate defined in the object detection module by a data aligner in accordance with the present invention.

FIG. 2 illustrates a system coordinate defined in the object detection module by a data aligner. Data alignment is conducted as the first step. Camera streams with a frame rate $f_c$ and gyroscopeobtainangular velocity with frequency $f_g$ which is usually much higher than the frame rate.

With the timestamp of each frame, two moments of angular speed with the closest timestamp are used for a precise angular speed of this frame by linear interpolation.

The angular speed of each frame is integrated to provide angular difference $\theta=[\theta_1, \theta_2, \theta_3]$ rotated about x, y, and z coordinates. The system of coordinates is defined in FIG. 2.

Figure 3:
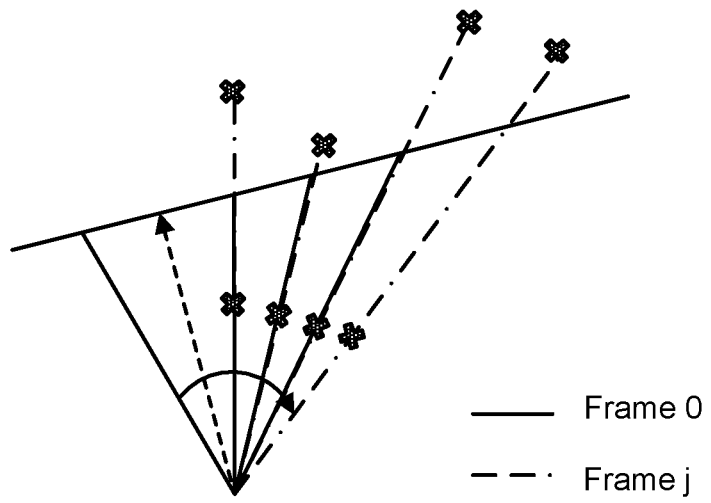
FIG. 3 illustrates a re-projection from frame j to the base frame in accordance with the present invention.

FIG. 3 illustrates a re-projection from frame j to the base frame. In the third step, the outstanding bounding boxes from each frame are re-projected to the base frame as illustrated in FIG. 3. Since the pure rotation of the camera will not be able to recover depth with the essential matrix, an assumption is made that all the objects are in 2-D and coplanar. The 3-D point with Euclidean coordinate in camera frame j:

$$\overline{m} = [x, y, z]^T$$

will be projected to image place with normalized coordinate in frame j:

$$m = [m_x, m_y, 1]^T = \frac{\overline{m}}{z} = \left[\frac{x}{z}, \frac{y}{z}, 1\right]^T$$

which can be mapped into pixel coordinate by camera intrinsic matrix K:

$$p = \begin{bmatrix} u \\ v \\ 1 \end{bmatrix} = Km = \begin{bmatrix} f_x & -f_x \tan \alpha & u_0 \\ 0 & f_y \sec \alpha & v_0 \\ 0 & 0 & 1 \end{bmatrix} \begin{bmatrix} m_x \\ m_y \\ 1 \end{bmatrix}$$

In this case, a homographic matrix can be used to indicate the relationship between each frame. Homographic matrix from frame j−1 to frame j can be expressed as follows:

$$H_{j-1}^{j} = R_{j-1}^{j} = R_z(\theta_3)R_y(\theta_2)R_x(\theta_1)$$

$$R_x(\theta_1) = \begin{bmatrix} 1 & 0 & 0 \\ 0 & \cos\theta_1 & -\sin\theta_1 \\ 0 & \sin\theta_1 & \cos\theta_1 \end{bmatrix}$$

$$R_y(\theta_2) = \begin{bmatrix} \cos\theta_2 & 0 & \sin\theta_2 \\ 0 & 1 & 0 \\ -\sin\theta_2 & 0 & \cos\theta_2 \end{bmatrix}$$

$$R_z(\theta_3) = \begin{bmatrix} \cos\theta_3 & -\sin\theta_3 & 0 \\ \sin\theta_3 & \cos\theta_3 & 0 \\ 0 & 0 & 1 \end{bmatrix}$$

Homographic matrix from frame 0 to frame j can be accumulated from the previous relations.

$$H_0^j = H_0^1 H_1^2 \ldots H_{j-1}^j$$

Point $m^j$ in the image plane of frame j can be written in reference to frame j−1.

$$m^{j-1} = H_{j-1}^j m^j$$

Combining with equation (3), 2D point in pixel coordinate of frame j can be reprojected to the base frame by:

$$m^0 = H_0^j m^j$$

$$p_0 = K H_0^j K^{-1} p_j$$

By now, all the object bounding boxes are based on the same pixel coordinate for further analysis.

Figure 4:
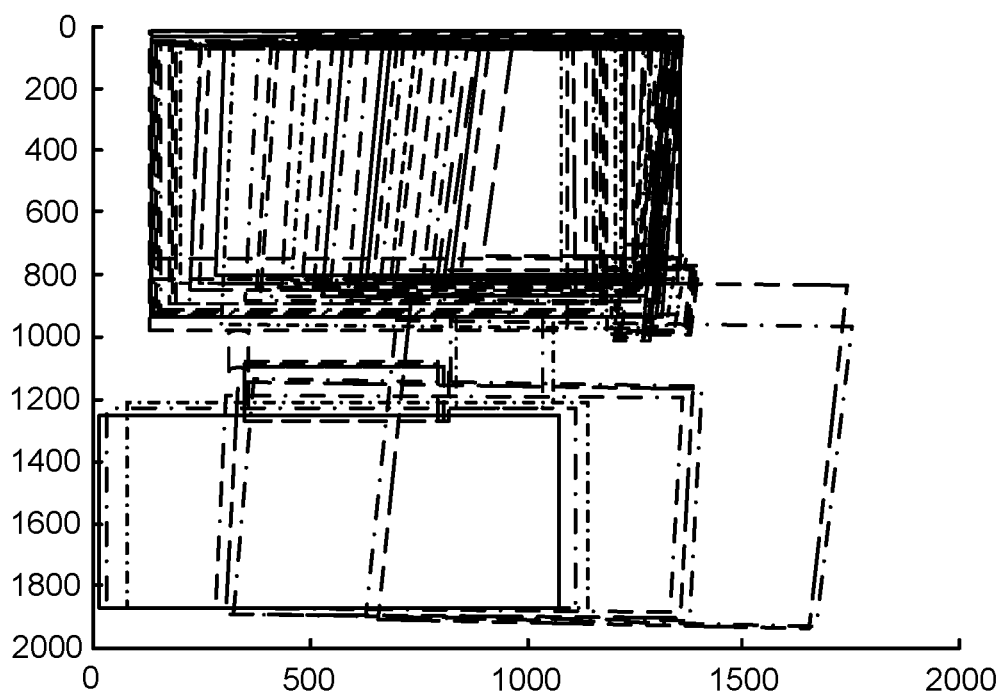
FIG. 4 illustrates an example of a bounding boxes result from the re-projection step in accordance with the present invention.

FIG. 4 illustrates an example of bounding boxes result from re-projection step. Non-maximum suppression (NMS) for each frame after re-projection where NMS is conducted to reject duplicate detection:

Each incoming bounding box is compared with the existed bounding box with the same class label in the database. Boxes with more than a certain threshold (e.g., 50%) overlap are considered as the same object.

Unlike normal object detection tasks with a stationary camera where the objects appear with a size invariant bounding box.

The objects may appear partially at the foregoing frame, exist completely for a while, and exit gradually in the sequential frame. An example of re-projected bounding box without NMS is shown in FIG. 4.

Figure 5:
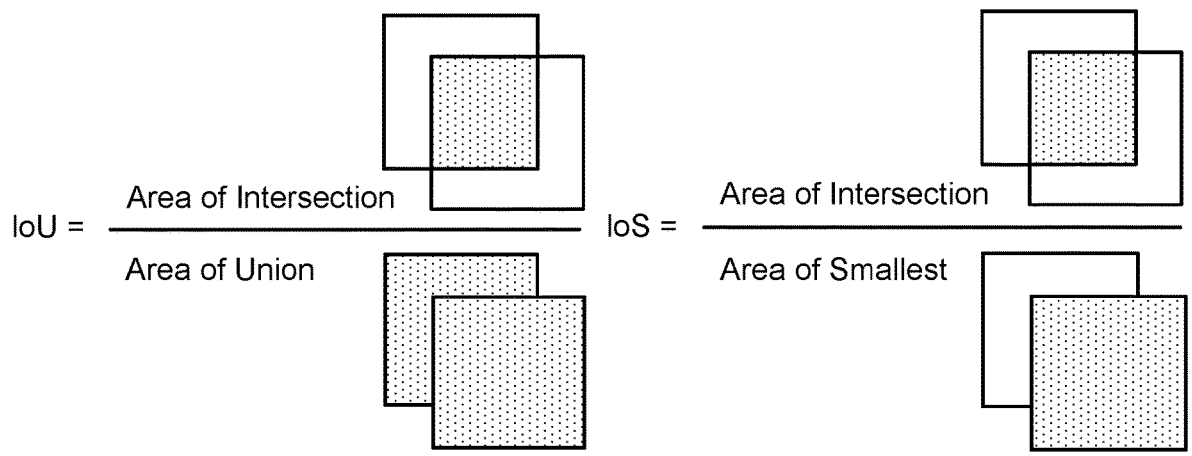
FIG. 5 illustrates an illustration of different criteria of overlap in the NMS module in accordance with the present invention.

FIG. 5 illustrates an example of different criteria of overlap in the NMS module. The non-maximum suppression module comprises a comparator and a retriever. The comparator compares each 2-D bounding box of the one or more objects with each other and allocates a group ID to similar the 2-D bounding box. And the retriever retrieves one or more objects with the group ID for counting the objects in the ultra-wide scene. When the camera pitches from left to right, the object at the top is cutout of the frame from its left and leaves a partial bounding box to its right. Hence, "Intersection over smallest" (IoS) is applied instead of "Intersection over Union" (IoU) as the criteria of overlap (FIG. 5).

Figure 6A:
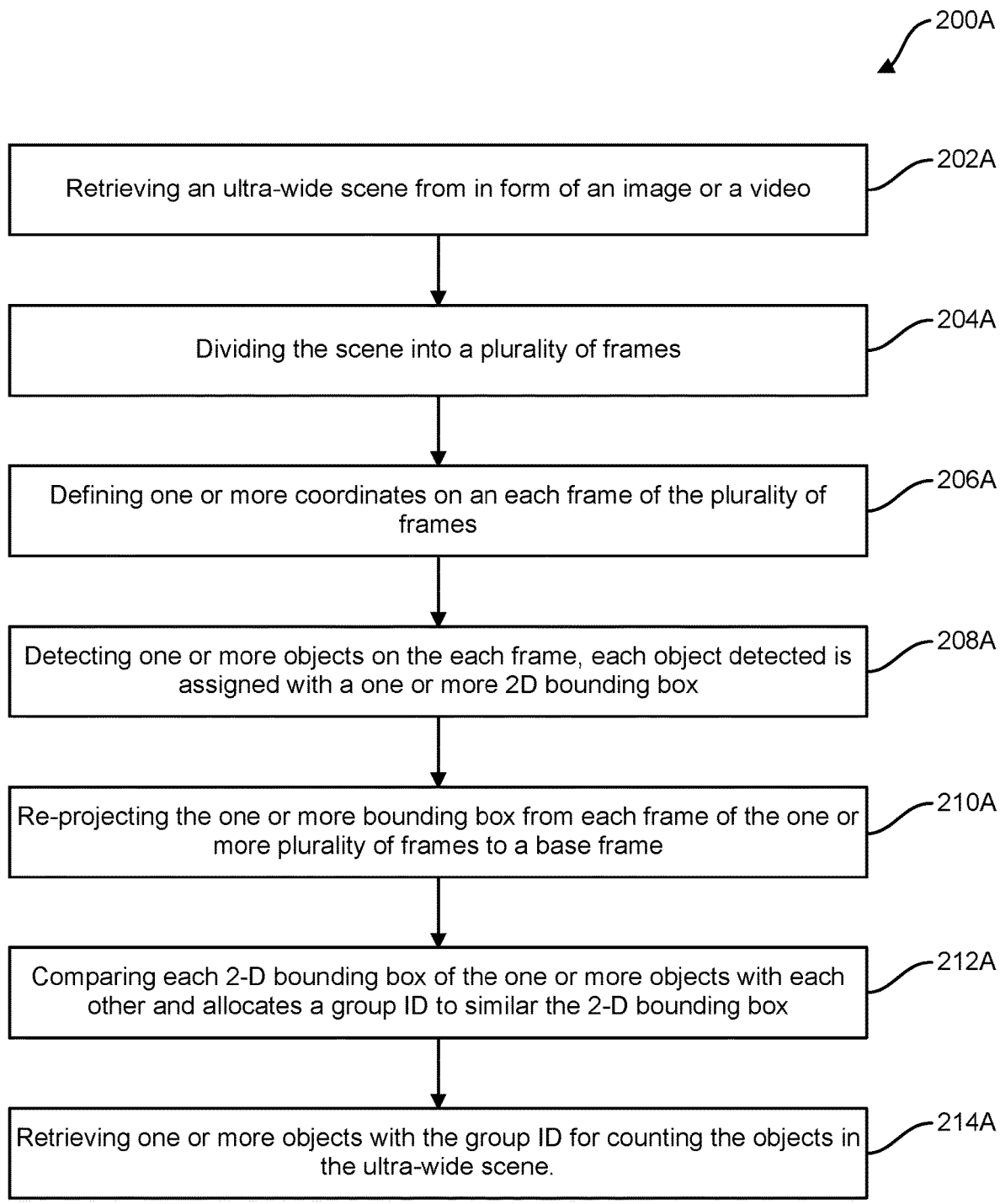
FIG. 6A illustrates a method for counting objects in an ultra-wide scene in accordance with the present invention.

FIG. 6A illustrates a method for counting objects in an ultra-wide scene. The method 200A comprises a number of steps: Firstly, an ultra-wide scene is retrieved in the form of an image or a video 202A conducted via a device set module. The scene is retrieved and divided into a plurality of frames 204A. Then one or more coordinates are defined on each frame of the plurality of frames 206A. These steps are performed via an object detection module through a data aligner and an object detector.

One or more objects are detected on each frame, where each object detected is assigned with a 2-D bounding box with frame coordinate and a classification ID for duplication filtering 208A.

Next the one or more bounding boxes are re-projected via a re-projection module from each frame of the one or more plurality of frames to a base frame 210A. Each 2-D bounding box is compared of one or more objects with each other and allocates a group ID to the similar the 2-D bounding box 212A. Finally, one or more objects are retrieved with the group ID for counting the objects in the ultra-wide scene 214A.

Figure 6B:
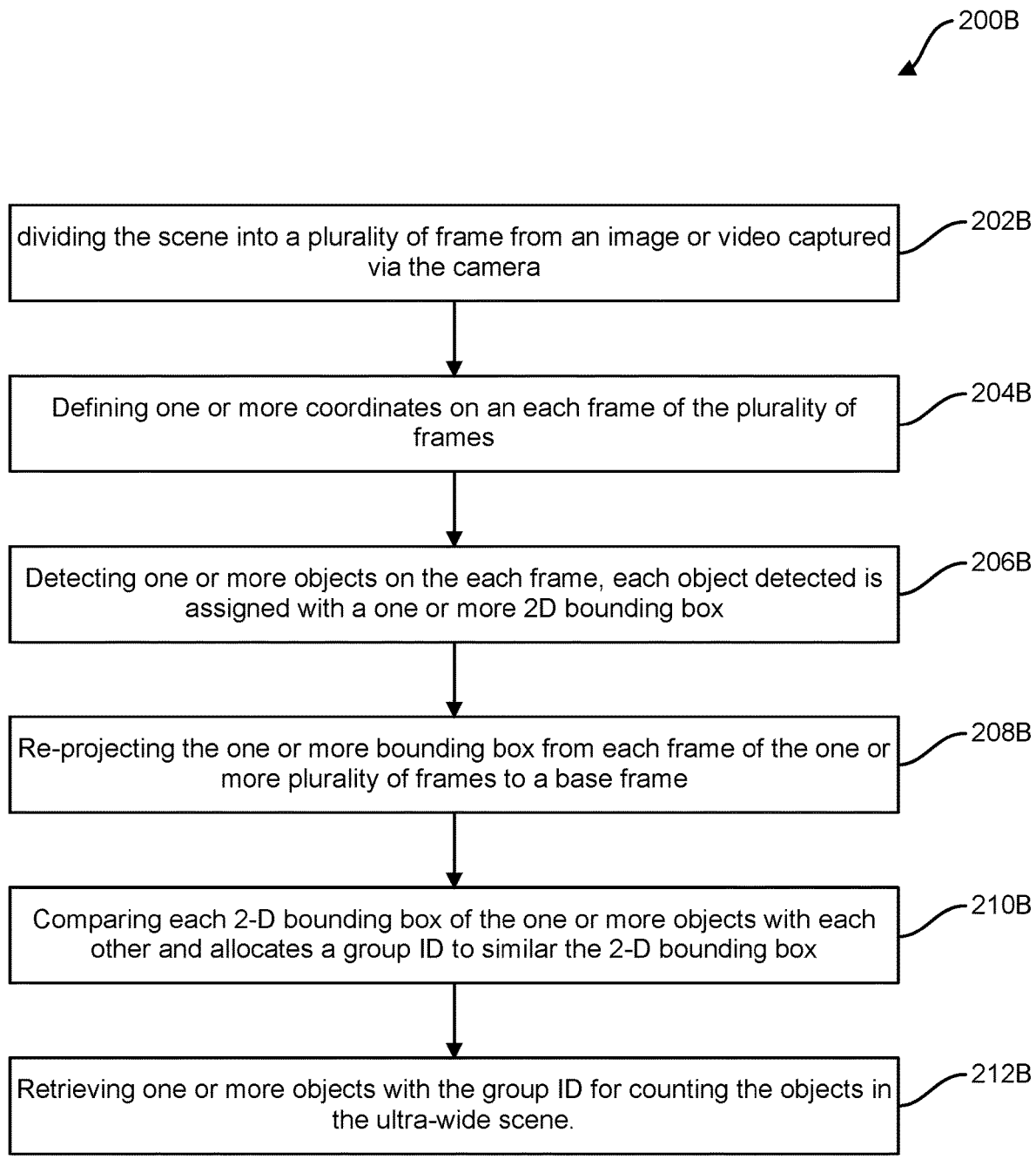
FIG. 6B illustrates a method for counting objects for an ultra-wide scene with a rotatable camera and low-cost IMU in accordance with the present invention.

FIG. 6B illustrates a method 600B for counting objects for an ultra-wide scene with a rotatable camera and low-cost IMU. Firstly, an ultra wide scene is retrieved from an image or a video and divided into a plurality of frames 202B. Then one or more coordinates are defined on each frame of the plurality of frames 204B.

One or more objects are detected on each frame, where each object detected is assigned with a 2-D bounding box with in frame coordinate and a classification ID for duplication filtering 206B.

Then, the one or more bounding boxes are re-projected from each frame of the one or more plurality of frames to a base frame 208B. Each 2-D bounding box is compared of the one or more objects with each other and allocate a group ID to the similar the 2-D bounding box 210B. Finally, one or more objects are retrieved with the group ID for counting the objects in the ultra-wide scene 212B.

While, the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for counting objects, comprising:
a device set module comprising a rotatable camera and an IMU, wherein the rotatable camera captures an ultra-wide scene;
an object detection module comprising a data aligner and an object detector, wherein the data aligner divides the ultra-wide scene into a plurality of frames and defines one or more coordinates of the plurality of frames, and wherein the object detector detects one or more objects in the plurality of frames and assigns a 2-D bounding box and a classification ID to the one or more objects;
a re-projection module, wherein the re-projection module re-projects the 2-D bounding box from the plurality of frames to a base frame; and
a non-maximum suppression module, wherein the non-maximum suppression module comprises a comparator and a retriever, wherein the comparator compares each 2-D bounding box of the one or more objects with each other and allocates a group ID to a similar 2-D bounding box, and wherein the retriever retrieves one or more objects with the group ID for counting the objects.

2. The system of claim 1, wherein a gyroscope is mounted on the rotatable camera to provide real-time information.

3. The system of claim 1, wherein the object detection module is based on a lightweight artificial intelligence model.

4. The system of claim 3, wherein the lightweight artificial intelligence model can be optimized and quantized before detection of the objects.

5. The system of claim 3, wherein the lightweight artificial intelligence model is a pre-trained model selected from either of SSD or Yolo.

6. The system of claim 1, wherein the object detection module is coupled with one or more algorithms to enrich one or more features of the one or more objects.

7. The system of claim 6, wherein the one or more features comprise color of the object or direction of the object to improve the precision of identifying the objects after re-projection.

8. The system of claim 1, wherein the 2-D bounding box is associated with a location-in-frame coordinate.

9. The system of claim 1, wherein the classification ID is associated with a score for duplication filtering.

10. The system of claim 1, wherein the re-projection module re-projects the 2-D bounding box on the base frame before intersection of smallest logic over a non-maximum suppression.

11. The system of claim 1, wherein the non-maximum suppression module comprises a single 2-D bounding box for each of the one or more objects.

12. The system of claim 1, wherein the comparator considers a plurality of bounding boxes with a 50% or more threshold overlap as a same object.

13. The system of claim 12, wherein the plurality bounding boxes exceeding a confidence threshold for a relative class become an output for the re-projection.

14. The system of claim 13, wherein the re-projection improves the precision of identifying the same object.

15. A system for counting objects, comprising:
a rotatable camera;
a low-cost IMU;
an object detection module comprising a data aligner and an object detector, wherein the data aligner divides an ultra-wide scene into a plurality of frames and defines one or more coordinates of the plurality of frames, and wherein the object detector detects one or more objects in the plurality of frames and assigns a 2-D bounding box with a location in frame coordinates and a classification ID with a score for duplication filtering;
a re-projection module, wherein the re-projection module re-projects the 2-D bounding box from the plurality of frames to a base frame; and
a non-maximum suppression module comprising a comparator and a retriever, wherein the comparator compares each 2-D bounding box of the one or more objects with each other and allocates a group ID to a similar 2-D bounding box, and wherein the retriever retrieves one or more objects with the group ID for counting the objects.

16. A method for counting objects comprising:
dividing a scene into a plurality of frames from an image or video captured by a portable camera;
defining one or more coordinates on each frame of the plurality of frames;
detecting one or more objects on each frame, wherein each object detected is assigned with a 2D bounding box with in frame coordinates and a classification ID for duplication filtering;
re-projecting the bounding box from each frame of the one or more plurality of frames to a base frame;
comparing each 2-D bounding box of the one or more objects with each other and allocating a group ID to a similar 2-D bounding box; and
retrieving one or more objects with the group ID for counting the objects.

17. The method in accordance with claim 16 wherein the detection of one or more objects in each frame is based on assignment with at least one 2-D bounding box.

* * * * *